UNITED STATES PATENT OFFICE 2,016,025

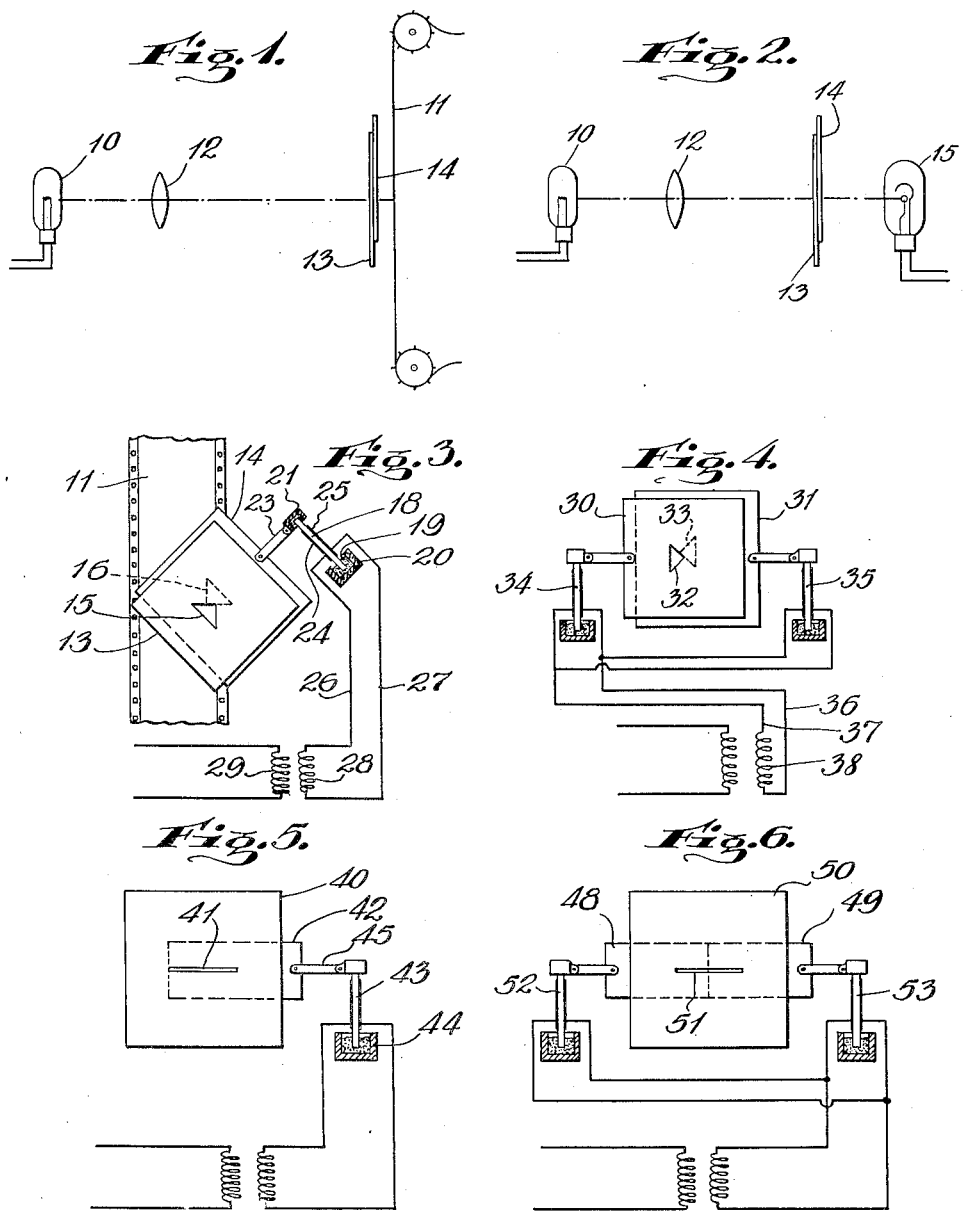

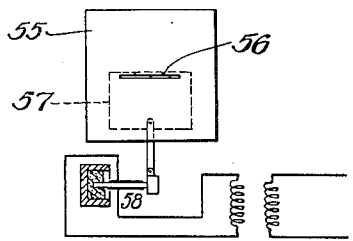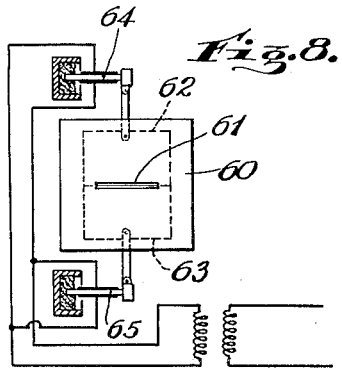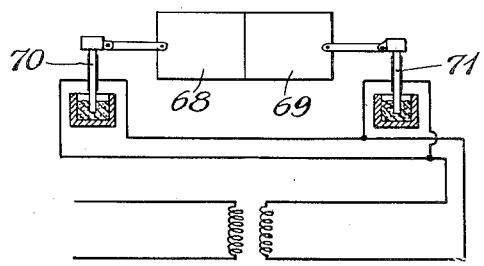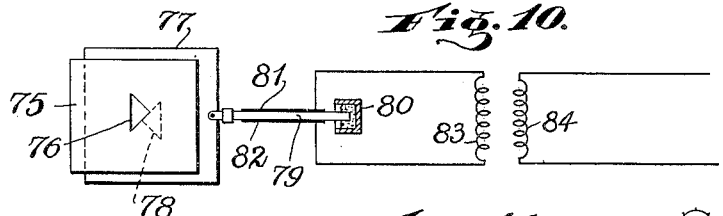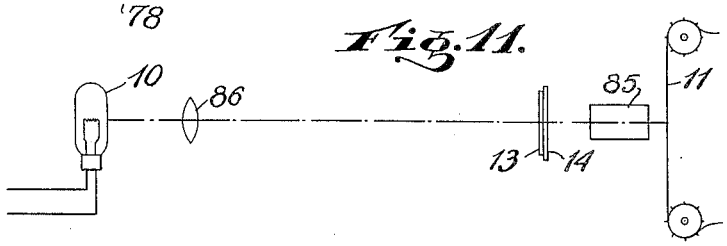

LIGHT VALVE

Romeyn B. Scribner, Bye, and Alfred E. Ekstrand, Tottenville, Staten Island, N. Y., assignors to Thomaston Laboratories, Inc., New York, N. Y., a corporation of New York Application January 9, 1933, Serial No. 650,768

3 Claims. (Cl. 88—61)

The present invention relates to apparatus for modulating a beam of light for the purpose of making sound records on films or other light sensitive surfaces, or for transmitting sound, as in light beam telephony.

In general there are three systems of modulating light beams, in one of which the intensity of the light itself is varied and the light is passed through an aperture of fixed dimensions, which aperture may be mechanical or optical, while in the others the intensity of the light is fixed. In the second system the amount of light admitted to the optical slit is varied, while in the third system the amount of light admitted to the optical slit is fixed but the amount of light emitted from the optical or other slit is varied after emission. The present invention relates more particularly to the latter systems and has for one object to provide a novel form of shutter or light valve for carrying out said systems.

Heretofore light valves have usually consisted of a fixed screen formed with a slit like aperture of maximum length and width and one or more movable screens or shutters actuated to open and close the aperture in proportion to sound frequencies that are to be recorded or transmitted. Such light valves vary the effective aperture or orifice in one dimension only. It is an object of the present invention to provide a light valve which will vary the effective aperture simultaneously in two dimensions, thereby obtaining an amplified effect.

Another object of the invention is to provide a novel driver for light valves of the novel type referred to above as well as for other types of light valves such as heretofore used, said driver being very sensitive and responding instantly to variations of potential in a control circuit.

A more specific object of the invention is to provide light valves controlled by crystals which possess piezo-electric properties.

Other objects of the invention will appear in the following description of several embodiments and thereafter the novelty and scope of the invention will be pointed out in the claims.

In the accompanying drawings:

Figure 1 is a diagram illustrating a typical arrangement of apparatus for making sound records on films;

Fig. 2 is a similar diagram of apparatus for modulating a beam directed upon a photo-electric cell;

Fig. 3 is a diagrammatic view of a preferred form of light valve with piezo-electric drive, the effective aperture of the valve being varied simultaneously in two dimensions;

Fig. 4 illustrates another form of light valve providing a two dimensional variation of the effective aperture and driven by a pair of oppositely movable piezo-electric elements;

Figs. 5 to 8 inclusive, illustrate various forms of shutters of well-known types but in which crystal drivers are used;

Fig. 9 is a form of light valve adapted particularly for use in light beam telephony;

Fig. 10 is a view of a light valve provided with another form of piezo-electric drive; and Fig. 11 is a diagram similar to that of Fig. 1 but with means for forming an optical slit between the screen and the film.

Referring first to the apparatus shown diagrammatically in Fig. 1, a source of light of fixed intensity, such as an incandescent electric lamp 10 is employed. The photographic film 11 is suitably mounted to move at a predetermined speed. A beam of light from the lamp 10 is focussed upon the film by means of a suitable condenser lens 12. Interposed between the lens and the film is the light valve for modulating the light beam. This light valve comprises a fixed screen 13 and a movable screen 14. Both of the screens are apertured and the movable screen is moved edgewise across the face of the fixed screen to vary the overlap of one aperture with respect to the other and thereby vary the cross-sectional area of the beam.

The apparatus shown diagrammatically in Fig. 2 is similar to that shown in Fig. 1, except that a photo-electric cell 15 is substituted for the film 11. This photo-electric cell may be located at a remote point to serve as a receiver of a light beam telephone system. The rest of the receiving apparatus is not shown as it forms no part of the present invention. It will be clear, however, that the variable light beam falling on the light cell will generate electrical energy varying in accordance with the light variations, which energy may be amplified as desired and be reconverted into sound.

In Fig. 3 is shown a preferred form of light valve used in recording sound upon the film 11. However, this light valve may also be employed to affect a photo-electric cell as shown in Fig. 2. The screen 14 is suitably mounted to move across the face of the screen 13. The particular mounting however is not shown as this may be of any of the forms now commonly used in light valves.

The screen 13 has a triangular aperture 12 therein and the screen 15 has a similar triangular

adjacent edges of the screens meet along the major axis of the slit 61. The screens 62 and 63 are driven by piezo-electric drivers 64 and 65 respectively which are connected in parallel, but in opposed phase, to a source of varying electric energy, in the same way as are the drivers shown in Fig. 6.

The light valve shown in Fig. 9 is very similar to that shown in Fig. 6, except that the fixed screen is omitted. There are two movable screens 68 and 69 which are driven by piezo-electric drivers 70 and 71 respectively, these drivers being connected in parallel, but in reverse phase, to a source of variable electrical energy and normally the screens 68 and 69 are disposed with their adjacent edges aligned so that no light may pass between them. As the screens are variably moved by the drivers 70 and 71 a slit for the passage of light will be formed between them, which slit will vary in accordance with the impressed charges on the crystals. Since there is no fixed screen to limit the length of the slit, this form of valve is not well suited for use in recording sound on the light sensitive film, but it is more particularly adapted for use in light beam telephony to modulate the light falling upon a photo-electric cell at a receiving station.

The piezo-electric devices described above are of the type in which flexure of the crystal is employed to move a shutter or screen. However, the piezo-electric elements may be cut from the parent crystal in such a plane that they will expand and contract lengthwise in response to variations of electrical energy. A light valve with a driver of the expanding and contracting type is shown in Fig. 10. In this figure a fixed screen 75 is provided with an aperture 76 and a movable screen 77 is provided with an aperture 78. These apertures may be of the form shown in Fig. 3. The piezo-electric element 79 is connected at one end to the screen 77 while the other end is secured in a fixed abutment 80. The crystal 79 is provided with foil electrodes 81 and 82 on opposite faces thereof and these electrodes are connected to the opposite terminals of a coupling coil 83 which is energized inductively by a coil 84 in a control circuit. In response to variations of energy in a control circuit, the element 79 will expand and contract lengthwise, thereby moving the screen 77 and variably overlapping the apertures 76 and 78 in proportion to the variations of energy in the control circuit. It will be obvious that this same form of drive may be used with any of the light valves shown in Figs. 3 to 9 inclusive.

The systems shown in Figs. 1 and 2 are of the type in which the beam of light is varied after emission from the condensing lens 12. Obviously in place of the lens 12 an optical system may be employed to produce an optical slit. In Fig. 11 we show another system similar to that shown in Fig. 1 except that a device for producing an optical slit is provided between the light valve and the film.

Corresponding parts in the Figs. 1 and 11 are given the same reference numerals. The lamp 10 serves as a source of light which is to be modulated and cast upon a film 11. The beam is modulated by a light valve comprising a fixed screen 13 and a movable screen 14. Between the light valve and the film is located the device 85 for producing an optical slit, so that the beam will issue from the device 85 in the form of a microscopic ribbon of required dimensions. The screens 13 and 14 vary the amount of light delivered to the device 85, thereby varying the density of the lines recorded by the light on the film. If desired a condensing lens 86 may be provided between the lamp 10 and the light valve. Any of the light valves shown in Figs. 3 to 9 may be used.

It will be understood, of course, that the light valve merely varies the amount of the light admitted to the device 85 and that the form of the aperture is not reproduced on the record. However, if desired, the device 85 instead of producing an optical slit may comprise one or more lenses which will cast on the film an image of the orifice formed through the light valve. In such case the size of the orifice may be considerably greater than the record desired on the film, and the lens in the device 85 would reduce the image of orifice to the desired dimensions and at the same time produce an image of increased brilliancy on the film.

While a number of embodiments of the invention have been illustrated and described, it will be understood that these are to be taken as illustrative and not limitative of the invention and that the right is reserved to make such changes in form, construction, and arrangement of parts as fall within the scope of the following claims.

We claim:
1. A light valve comprising a fixed screen and a movable screen, each screen having an aperture therein, a piezo-electric driver for variably moving the movable screen to overlap the apertures and form a variable orifice through the two screens, the overlapping portion of each aperture being in the form of a right angle with the bisector of each of said angles lying parallel to the direction of motion of the movable screen, but such bisectors being laterally offset with respect to each other.

2. A light valve comprising a pair of screens each formed with an aperture and relatively movable to overlap the apertures, a driver for each screen comprising a crystal possessing piezo-electric properties, a fixed mounting for one end of each crystal, the other end being free to flex, mechanical connections from the free ends of the crystals to the screens respectively, a source of variable electric potential and conductors connecting said crystals to said source in opposed phase, whereby the crystals will move oppositely in response to variations of potential at said source.

3. A light valve for modulating a beam of light, said valve comprising a pair of screens oppositely movable to form a passage for said beam, a piezo-electric driver for each screen comprising a crystal variable in length in response to variations of electrical energy, each crystal being in operative engagement at one end to the screen it drives, a fixed abutment for the opposite end of each crystal, a source of variable electric energy and conductors connecting said crystals to said source in opposed phase, whereby the crystals will move oppositely in response to variations of energy at said source.

ROMEYN B. SCRIBNER.
ALFRED E. EKSTRAND.